United States Patent
Huang (12) 
(10) Patent No.: US 11,977,307 B1
(45) Date of Patent: May 7, 2024

(54) CHOLESTERIC LIQUID CRYSTAL DISPLAY DEVICE

(71) Applicant: HIMAX TECHNOLOGIES LIMITED, Tainan (TW)

(72) Inventor: Han Wen Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/353,118

(22) Filed: Jul. 17, 2023

(51) Int. Cl.
  *G02F 1/137* (2006.01)
  *G02F 1/1335* (2006.01)
  *G02F 1/1345* (2006.01)
  *G09G 3/36* (2006.01)

(52) U.S. Cl.
  CPC .... *G02F 1/13718* (2013.01); *G02F 1/133512* (2013.01); *G02F 1/13452* (2013.01); *G09G 3/3677* (2013.01); *G02F 2203/055* (2013.01); *G09G 2300/023* (2013.01); *G09G 2300/0486* (2013.01); *G09G 2310/0286* (2013.01); *G09G 2310/0289* (2013.01)

(58) Field of Classification Search
  CPC .......... G02F 1/13718; G02F 1/133512; G02F 1/13452; G02F 1/13473; G09G 3/3677; G09G 2203/055; G09G 2300/023; G09G 2300/0486; G09G 2310/0286; G09G 2310/0289
  USPC .............. 349/74, 78, 81, 149, 150, 175, 185
  See application file for complete search history.

(56) References Cited

U.S. PATENT DOCUMENTS

| | | | | |
|---|---|---|---|---|
| 2002/0109812 A1* | 8/2002 | Takami | ............... | G02F 1/13473 349/113 |
| 2003/0043334 A1* | 3/2003 | Sato | ..................... | G02F 1/13473 349/156 |
| 2008/0100789 A1* | 5/2008 | Kamiya | ............ | G02F 1/133305 349/149 |
| 2009/0309820 A1* | 12/2009 | Chen | ..................... | G09G 3/3677 326/82 |

* cited by examiner

*Primary Examiner* — Dung T Nguyen
*Assistant Examiner* — David Y Chung
(74) *Attorney, Agent, or Firm* — CKC & Partners Co., LLC (57) ABSTRACT

The cholesteric liquid crystal display (CLCD) device includes first and second cholesteric liquid crystal panels that reflect light within different wavelength ranges. Both panels have gate lines that extend from one side to the other. A gate driver is electrically connected to the first panel's gate lines. Additionally, a flexible printed circuit is electrically connected to both the first and second panels' gate lines.

13 Claims, 6 Drawing Sheets

CHOLESTERIC LIQUID CRYSTAL DISPLAY DEVICE

BACKGROUND

Field of Invention

The present disclosure relates to a mechanism of driving a cholesteric liquid crystal display (CLCD) device.

Description of Related Art

CLCD is a special liquid crystal mode with a helical arrangement of molecules. It achieves a particular alignment structure by adding chiral dopants to nematic liquid crystal. Generally, multiple panels need to be set up, and each panel reflects different colors of light to achieve the purpose of color display. However, such a device requires multiple independent driving circuits to drive the multiple panels, resulting in higher cost.

SUMMARY

Embodiments of the present disclosure provide a cholesteric liquid crystal display (CLCD) device including first and second cholesteric liquid crystal panels, a gate driver, and a first flexible printed circuit. The first cholesteric liquid crystal panel reflects light within a first wavelength range, in which the first cholesteric liquid crystal panel includes multiple first gate lines extending from a first side of the first cholesteric liquid crystal panel to a second side of the first cholesteric liquid crystal panel. The second cholesteric liquid crystal panel reflects light within a second wavelength range, in which the second cholesteric liquid crystal panel includes multiple second gate lines extending from a first side of the second cholesteric liquid crystal panel to a second side of the second cholesteric liquid crystal panel. The gate driver is disposed at the first side of the first cholesteric liquid crystal panel and electrically connected to the first gate lines. The first flexible printed circuit has a first end and a second end, in which the first end of the first flexible printed circuit is disposed at the second side of the first cholesteric liquid crystal panel and electrically connected to the first gate lines, and the second end of the first flexible printed circuit is disposed at the second side of the second cholesteric liquid crystal panel and electrically connected to the second gate lines, such that the first gate lines are electrically connected to the second gate line respectively.

In some embodiments, the CLCD device further includes a third cholesteric liquid crystal panel configured to reflect light within a third wavelength range, in which the third cholesteric liquid crystal panel includes multiple third gate lines extending from a first side of the third cholesteric liquid crystal panel to a second side of the third cholesteric liquid crystal panel. A second flexible printed circuit has a first end and a second end, in which the first end of the second flexible printed circuit is disposed at the first side of the second cholesteric liquid crystal panel and electrically connected to the second gate lines, and the second end of the second flexible printed circuit is disposed at the first side of the third cholesteric liquid crystal panel and electrically connected to the third gate lines, such that the second gate lines are electrically connected to the third gate lines respectively.

In some embodiments, the first flexible printed circuit has a first surface and a second surface opposite to each other. Multiple first pads are disposed on the first surface of the first flexible printed circuit and positioned at the first end of the first flexible printed circuit. Multiple second pads are electrically connected to the first pads respectively, and disposed on the second surface of the first flexible printed circuit and positioned at the second end of the first flexible printed circuit.

In some embodiments, the first cholesteric liquid crystal panel and the second cholesteric liquid crystal panel are stacked up such that the first side of the first cholesteric liquid crystal panel is aligned with the first side of the second cholesteric liquid crystal panel, and the second side of the first cholesteric liquid crystal panel is aligned with the second side of the second cholesteric liquid crystal panel.

In some embodiments, the first flexible printed circuit is bent such that the first pads are in contact with the first cholesteric liquid crystal panel and the second pads are in contact with the second cholesteric liquid crystal panel.

In some embodiments, the second flexible printed circuit has a third surface and a fourth surface opposite to each other. Multiple third pads are disposed on the third surface and positioned at the first end of the second flexible printed circuit. Multiple fourth pads are electrically connected to the third pads respectively, disposed on the fourth surface and positioned at the second end of the second flexible printed circuit.

In some embodiments, the second cholesteric liquid crystal panel and the third cholesteric liquid crystal panel are stacked up such that the first side of the second cholesteric liquid crystal panel is aligned with the first side of the third cholesteric liquid crystal panel, and the second side of the second cholesteric liquid crystal panel is aligned with the second side of the third cholesteric liquid crystal panel.

In some embodiments, the second flexible printed circuit is bent such that the third pads are in contact with the second cholesteric liquid crystal panel and the fourth pads are in contact with the third cholesteric liquid crystal panel.

In some embodiments, during a display period, the gate driver is configured to transmit multiple gate driving signals to the first gate lines. The gate driving signals are transmitted to the second gate lines through the first flexible printed circuit and then to the third gate lines through the second flexible printed circuit.

In some embodiments, the first cholesteric liquid crystal panel, the second cholesteric liquid crystal panel, and the third cholesteric liquid crystal panel form a stack, and the CLCD device further includes a light absorbing layer disposed at one side of the stack.

In some embodiments, cell gaps of the first cholesteric liquid crystal panel, the second cholesteric liquid crystal panel, and the third cholesteric liquid crystal panel are different from each other.

In some embodiments, the first wavelength range is a blue wavelength range, the second wavelength range is a green wavelength range, and the third wavelength range is a red wavelength range.

In some embodiments, the gate driver includes a shift register, a level shifter electrically connected to the shift register, at least one P-type transistor and at least one N-type transistor. The P-type transistor has a control end electrically connected to the level shifter, a first end electrically connected to a first system voltage, and a second end electrically connected to one of the first gate lines. The N-type transistor has a control end electrically connected to the level shifter, a first end electrically connected to the one of the first gate lines, and a second end electrically connected to a second system voltage.

In some embodiments, a number of the P-type transistor is greater than one, and a number of the N-type transistor is greater than one.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
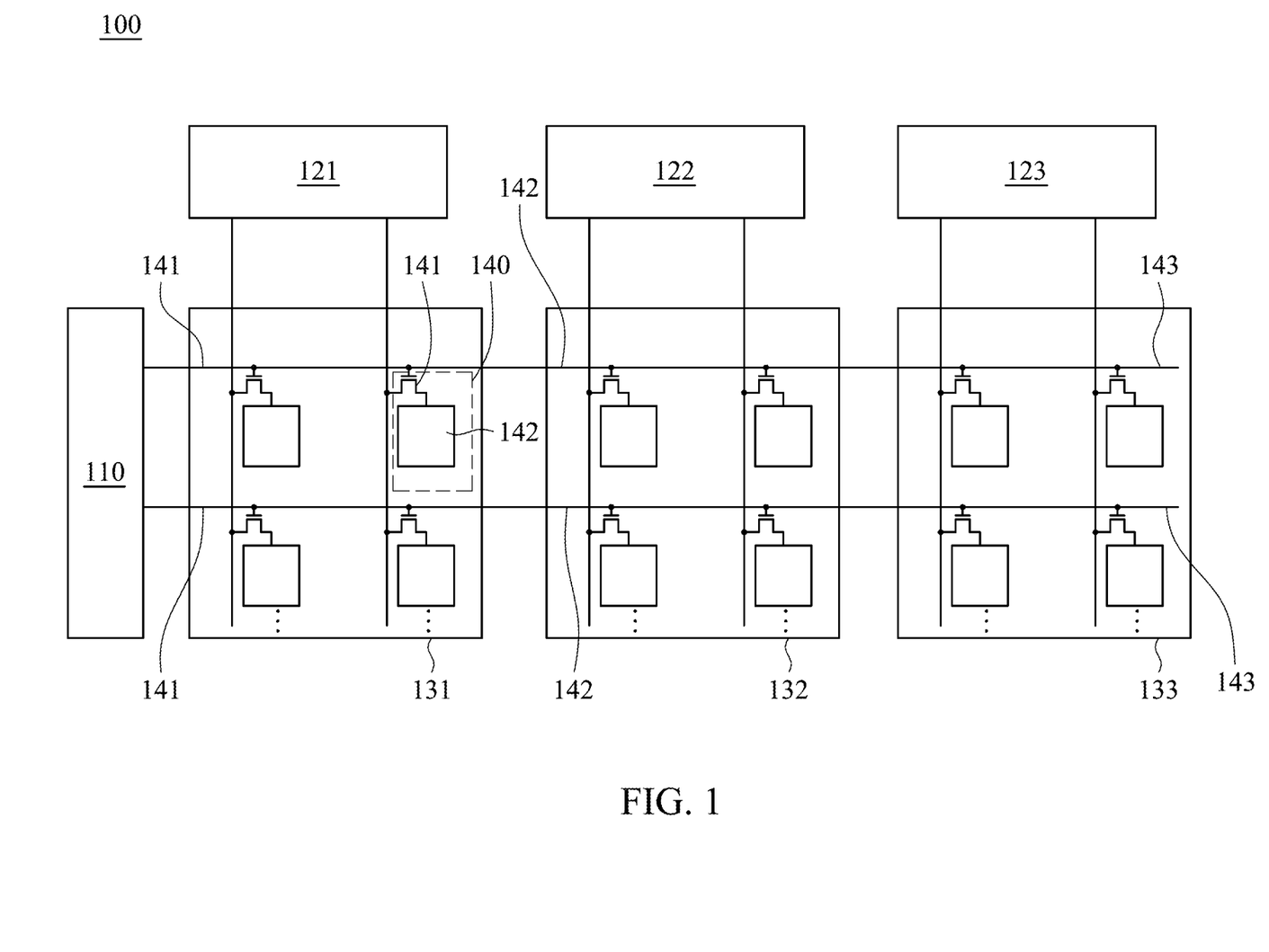
FIG. 1 is a schematic diagram of a CLCD device according to an embodiment.

FIG. 1 is a schematic diagram of a CLCD device according to an embodiment. Referring to FIG. 1, a CLCD device 100 includes a gate driver 110, source drivers 121-123, and cholesteric liquid crystal panels 131-133. The cholesteric liquid crystal panel 131 includes multiple gate lines 141, the cholesteric liquid crystal panel 132 includes multiple gate lines 142, and the cholesteric liquid crystal panel 133 includes multiple gate lines 143. Each of the cholesteric liquid crystal panels 131-133 includes multiple pixels, and each pixel includes a thin film transistor and a pixel electrode. Taking a pixel 140 as an example, the pixel 140 includes a thin film transistor 141 and a pixel electrode 142. The gate of the thin film transistor 141 is electrically connected to one of the gate lines 141, the source of the thin film transistor 141 is electrically connected to a data line, and the drain of the thin film transistor 141 is electrically connected to the pixel electrode 142. The cholesteric liquid crystal panels 131-133 share the gate driver 110. This means that the gate driver 110 sends gate driving signals to the gate lines 141-143, thereby simultaneously driving the cholesteric liquid crystal panels 131-133. On the other hand, the cholesteric liquid crystal panels 131-133 correspond to the source drivers 121-123 respectively. The source drivers 121-123 transmit grayscale signals to the corresponding cholesteric liquid crystal panels 131-133 through the data lines.

Figure 2:
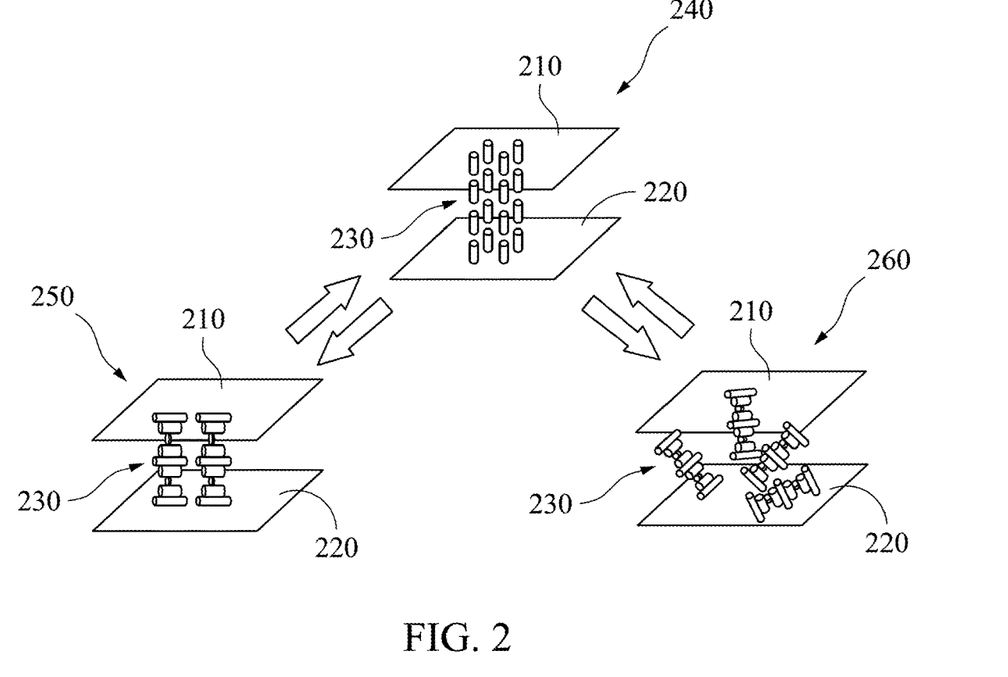
FIG. 2 is a diagram illustrating the operating mode of a cholesteric liquid crystal panel according to an embodiment.

FIG. 2 is a diagram illustrating the operating mode of the cholesteric liquid crystal panel according to an embodiment. Referring to FIG. 2, the operating principles of the cholesteric liquid crystal panels 131-133 are the same. Taking the cholesteric liquid crystal panel 131 as an example, the cholesteric liquid crystal panel 131 includes substrates 210 and 220, and a liquid crystal unit 230 is disposed between the substrates 210 and 220. The cholesteric liquid crystal panel 131 can operate in a transient state 240, a bright state 250, and a dark state 260. When an external voltage is applied, it is in the transient state 240, the liquid crystal unit 230 is arranged in a homeotropic texture, and the liquid crystal unit 230 displays an image according to the magnitude of the applied voltage. When no external voltage is applied, the cholesteric liquid crystal panel 131 enters either the bright state 250 or the dark state 260 depending on the speed of the voltage being released. In the bright state 250, the liquid crystal unit 230 is arranged in a planar texture, and the liquid crystal unit 230 is regularly aligned, allowing external light to be partially reflected. In the dark state 260, the liquid crystal unit 230 is arranged in a focal conic texture, and the liquid crystal unit 230 is irregularly aligned, causing external light to be completely absorbed.

Figure 3:
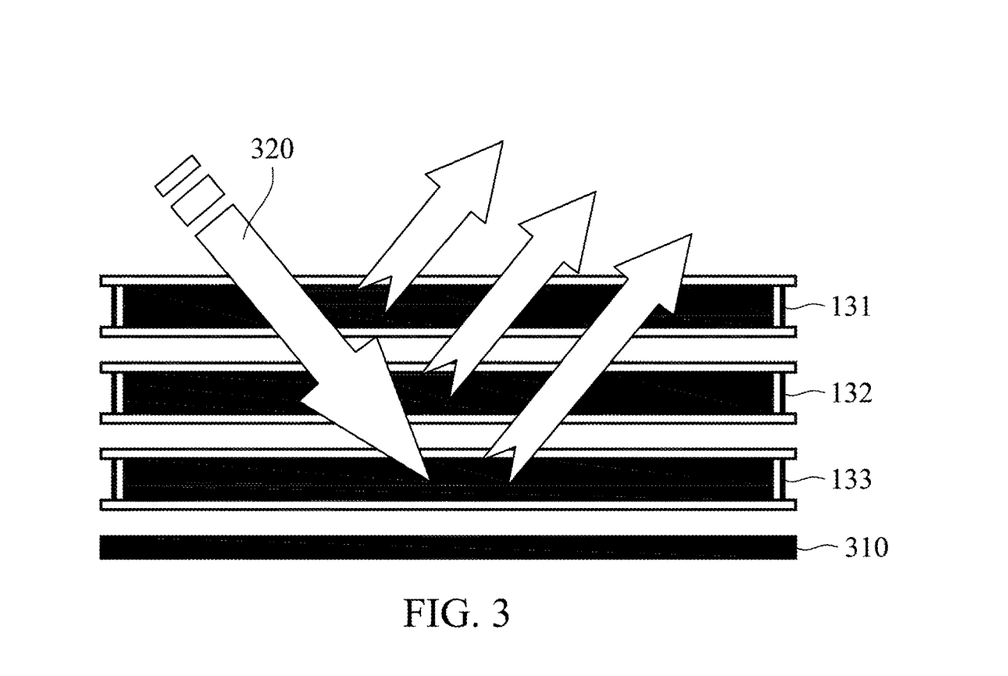
FIG. 3 is a schematic diagram of multiple cholesteric liquid crystal panels reflecting light according to an embodiment.

FIG. 3 is a schematic diagram of multiple cholesteric liquid crystal panels reflecting light according to an embodiment. Referring to the cross-sectional view of FIG. 3, the cholesteric liquid crystal panels 131-133 form a stack, and a light absorbing layer 310 is disposed on one side of the stack (for example, the bottom side). The cell gaps of the cholesteric liquid crystal panels 131-133 are different from each other, so according to the principle of Bragg reflection, the cholesteric liquid crystal panels 131-133 reflect light of different wavelengths. For example, the cell gap of cholesteric liquid crystal panel 131 is smaller than that of the cholesteric liquid crystal panel 132, and the cell gap of cholesteric liquid crystal panel 132 is smaller than that of the cholesteric liquid crystal panel 133. The cholesteric liquid crystal panel 131 reflects light in a first wavelength range, the cholesteric liquid crystal panel 132 reflects light in a second wavelength range, and the cholesteric liquid crystal panel 133 reflects light in a third wavelength range. Since the cell gap is directly proportional to the wavelength of the reflected light, the wavelength of the light reflected by the cholesteric liquid crystal panel 131 is shorter than the others. In some embodiments, the first wavelength range is a blue wavelength range (e.g., 450-495 nanometers), the second wavelength range is a green wavelength range (e.g., 495-570 nanometers), and the third wavelength range is a red wavelength range (e.g., 620-750 nanometers). However, those skilled in the art will understand that the present disclosure is not limited to the aforementioned embodiments, as the cell gap can be adjusted to reflect light of any specific wavelength. When light 320 is incident from the outside, the cholesteric liquid crystal panel 131 reflects blue light, the cholesteric liquid crystal panel 132 reflects green light, and the cholesteric liquid crystal panel 133 reflects red light. The remaining light is absorbed by the light absorbing layer 310, allowing the user to see a color image.

Figure 4:
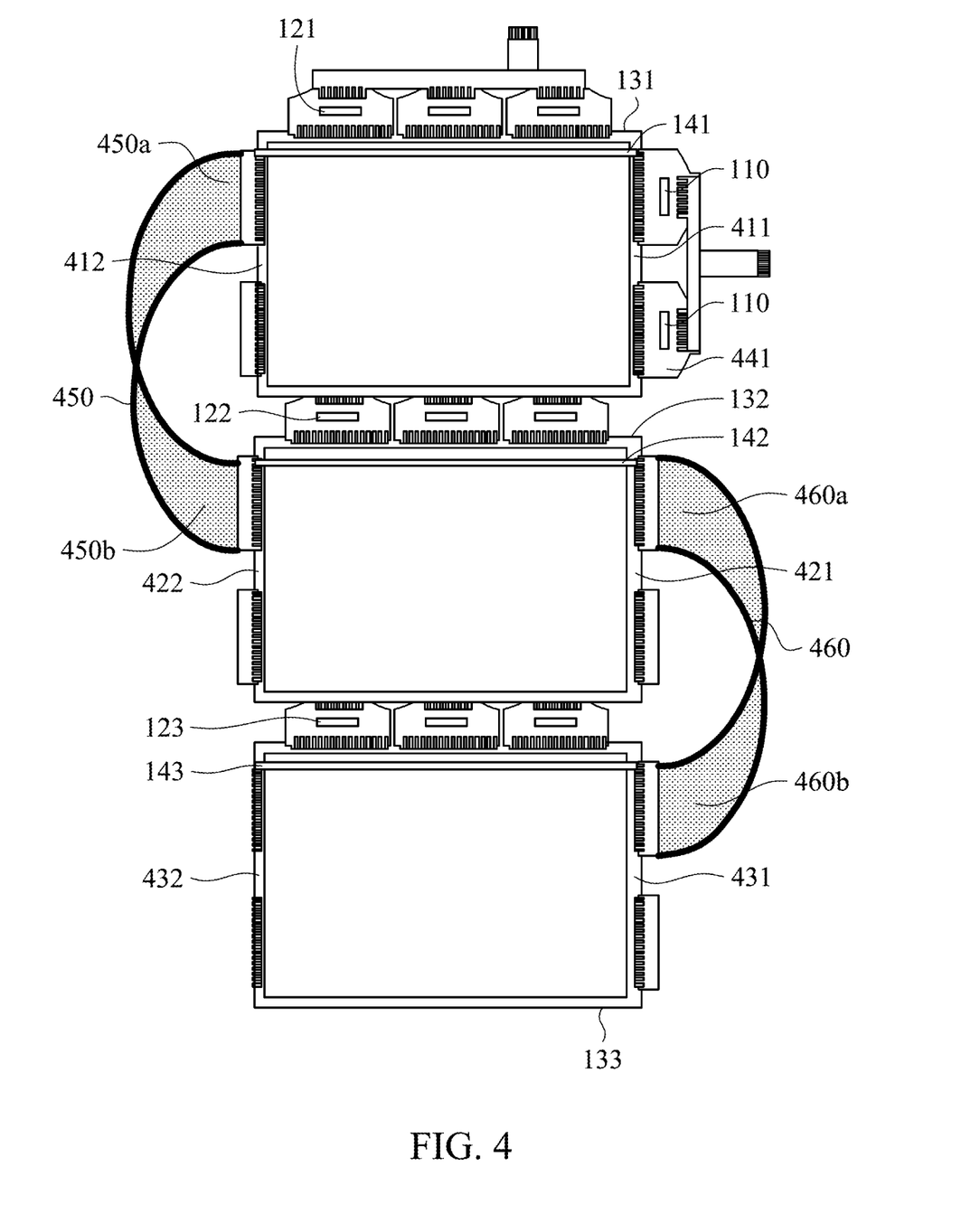
FIG. 4 is a schematic diagram of the connection relationship between multiple cholesteric liquid crystal panels in accordance with an embodiment.

Referring to FIG. 4, which illustrates a schematic diagram of the connection relationship between multiple cholesteric liquid crystal panels in accordance with an embodiment. As shown in FIG. 3, the cholesteric liquid crystal panels 131-133 are stacked vertically, but for the purpose of explanation, the cholesteric liquid crystal panels 131-133 are not overlapping with each other in FIG. 4. The cholesteric liquid crystal panel 131 has a first side 411 and a second side 412, and multiple gate lines 141 extend from the first side 411 to the second side 412. For simplification, only one gate line 141 is shown in FIG. 4. Similarly, the cholesteric liquid crystal panel 132 has a first side 421 and a second side 422, and the gate line 142 extends from the first side 421 to the second side 422. The cholesteric liquid crystal panel 133 has a first side 431 and a second side 432, and the gate line 143 extends from the first side 431 to the second side 432. In some embodiments, the cholesteric liquid crystal panels 131-133 are stacked up, such that the first side 411 is aligned with the first side 421 and the first side 431, and the second side 412 is aligned with the second side 422 and the second side 432. The gate driver 110 is disposed at the first side 411 of the cholesteric liquid crystal panel 131, for example, on a flexible printed circuit 441, and is electrically connected to the gate line 141. The source driver 121 is electrically connected to the data lines (not shown in FIG. 4) of the cholesteric liquid crystal panel 131, the source driver 122 is electrically connected to the data lines (not shown in FIG. 4) of the cholesteric liquid crystal panel 132, and the source driver 123 is electrically connected to the data lines (not shown in FIG. 4) of the cholesteric liquid crystal panel 133.

A flexible printed circuit 450 has a first end 450a and a second end 450b, where the first end 450a is located at the second side 412 of the cholesteric liquid crystal panel 131 and electrically connected to the gate line 141, and the second end 450b is located at the second side 422 of the cholesteric liquid crystal panel 132 and electrically connected to the gate line 142. The flexible printed circuit 450 includes circuitry that electrically connects the gate line 141 to the gate line 142. On the other hand, a flexible printed circuit 460 has a first end 460a and a second end 460b, where the first end 460a is located at the first side 421 of cholesteric liquid crystal panel 132 and electrically connected to the gate line 142, and the second end 460b is located at the first side 431 of the cholesteric liquid crystal panel 133 and electrically connected to the gate line 143. Similarly, the flexible printed circuit 460 has circuitry that electrically connects the gate line 142 to the gate line 143.

The gate driver 110 can drive the cholesteric liquid crystal panel 131-133 simultaneously through the flexible printed circuit 450 and the flexible printed circuit 460. During a display period, the gate driver 110 sends multiple gate driving signals to the gate lines 141, which are then transmitted to the second gate lines 142 via the flexible printed circuit 450, and to the gate lines 143 via the flexible printed circuit 460. These gate driving signals, such as square wave signals, are used to turn on the corresponding thin film transistors. As a result, the cholesteric liquid crystal panels 131-133 share a single gate driver 110 that has advantages of lower costs.

Figure 5:
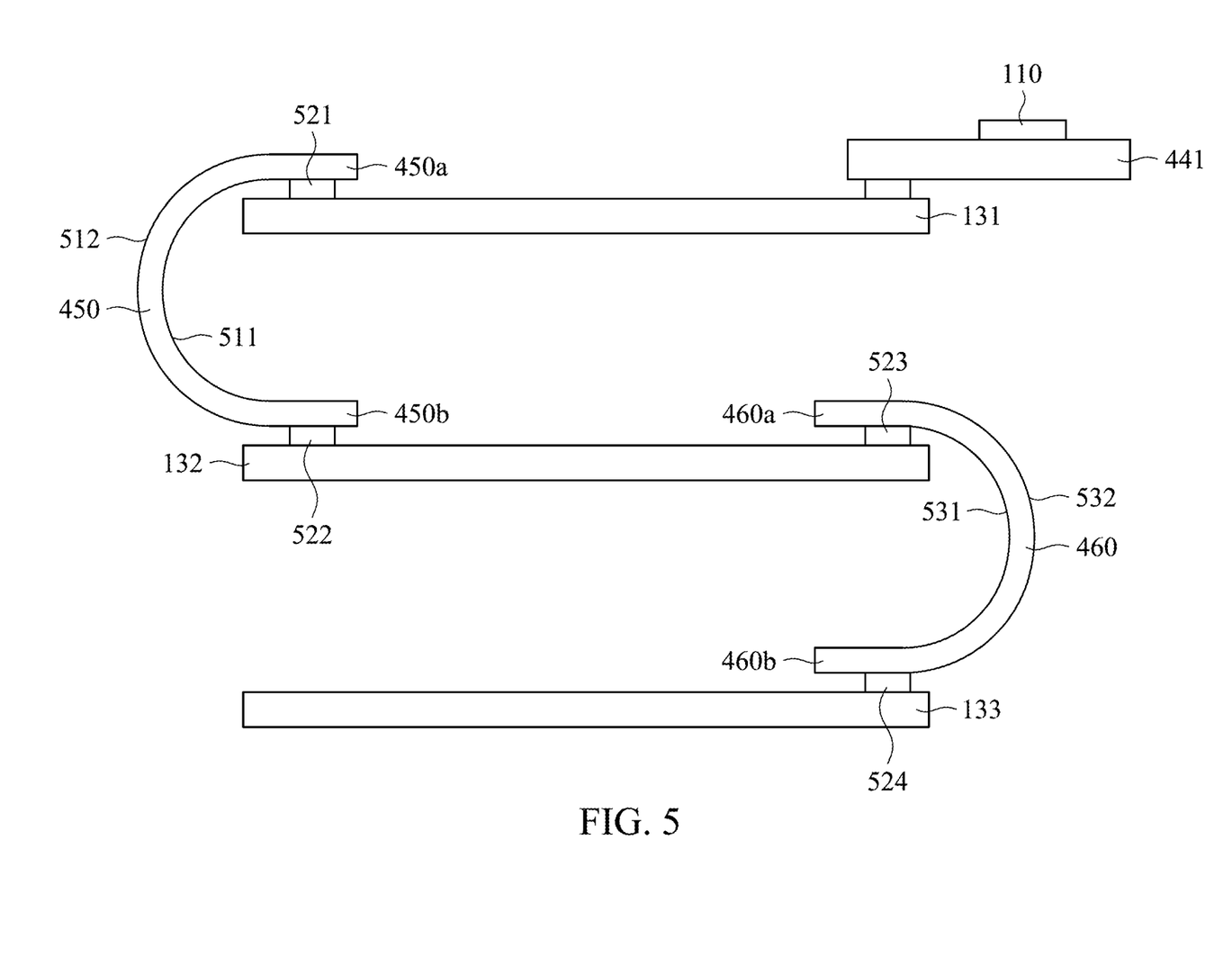
FIG. 5 is a diagram illustrating a cross-sectional view of the cholesteric liquid crystal panels and the flexible printed circuits in accordance with an embodiment.
Figure 6:
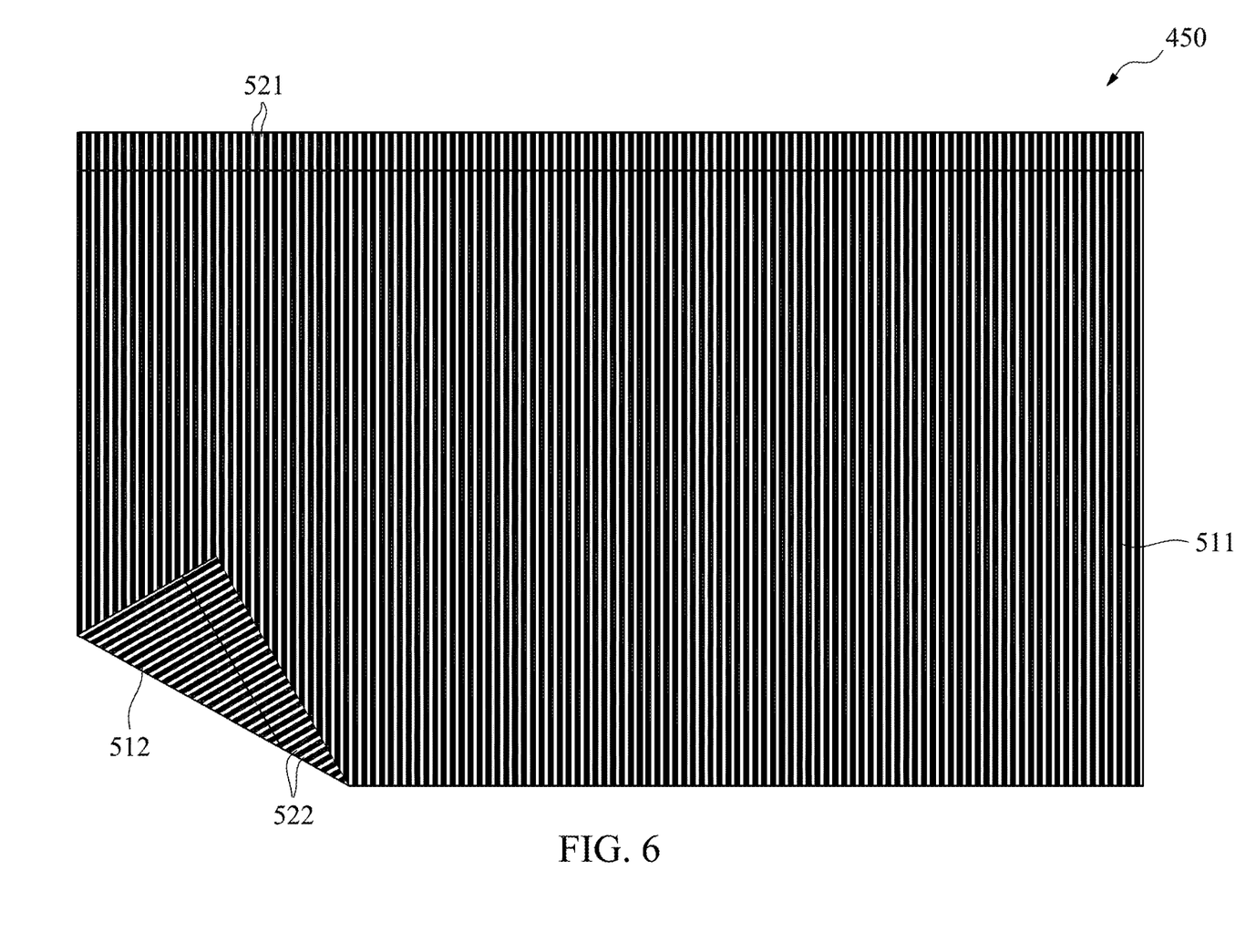
FIG. 6 is a diagram illustrating the pads on the flexible printed circuit in accordance with an embodiment.

FIG. 5 is a diagram illustrating a cross-sectional view of the cholesteric liquid crystal panels and the flexible printed circuits in accordance with an embodiment. Referring to FIG. 5, the flexible printed circuit 450 has a first surface 511 and a second surface 512 opposite to the each other. Multiple pads 521 are disposed on the first surface 511 and positioned at the first end 450a of the flexible printed circuit 450. Multiple second pads 522 are disposed on the second surface 512 and positioned at the second end 450b of the flexible printed circuit 450. FIG. 6 is a diagram illustrating the pads on the flexible printed circuit in accordance with an embodiment. Referring to FIG. 5 and FIG. 6, the pads 521 and the pads 522 are disposed on different surfaces of the flexible printed circuit 450. The flexible printed circuit 450 also includes circuits that electrically connect the pads 521 to the pads 522. In some embodiments, the flexible printed circuit 450 is bent such that the pads 521 are in contact with the pad or circuit (not shown) on the cholesteric liquid crystal panel 131, and the second pads 522 are in contact with, for example, pad or circuit of the cholesteric liquid crystal panel 132. Similarly, the flexible printed circuit 460 has a third surface 531 and a fourth surface 532 opposite to the each other. Multiple pads 523 are located on the third surface 531 and positioned at the first end 460a of flexible printed circuit 460. Multiple pads 524 are located on the fourth surface 532 and positioned at the second end 460b of the flexible printed circuit 460. The arrangement of the pads on flexible printed circuit 460 is similar to that shown in FIG. 6, with pads 523 being electrically connected to pads the 524 respectively. The flexible printed circuit 460 is bent such that pads 523 are in contact with the cholesteric liquid crystal panel 132, and the pads 524 are in contact with the cholesteric liquid crystal panel 133.

Figure 7:
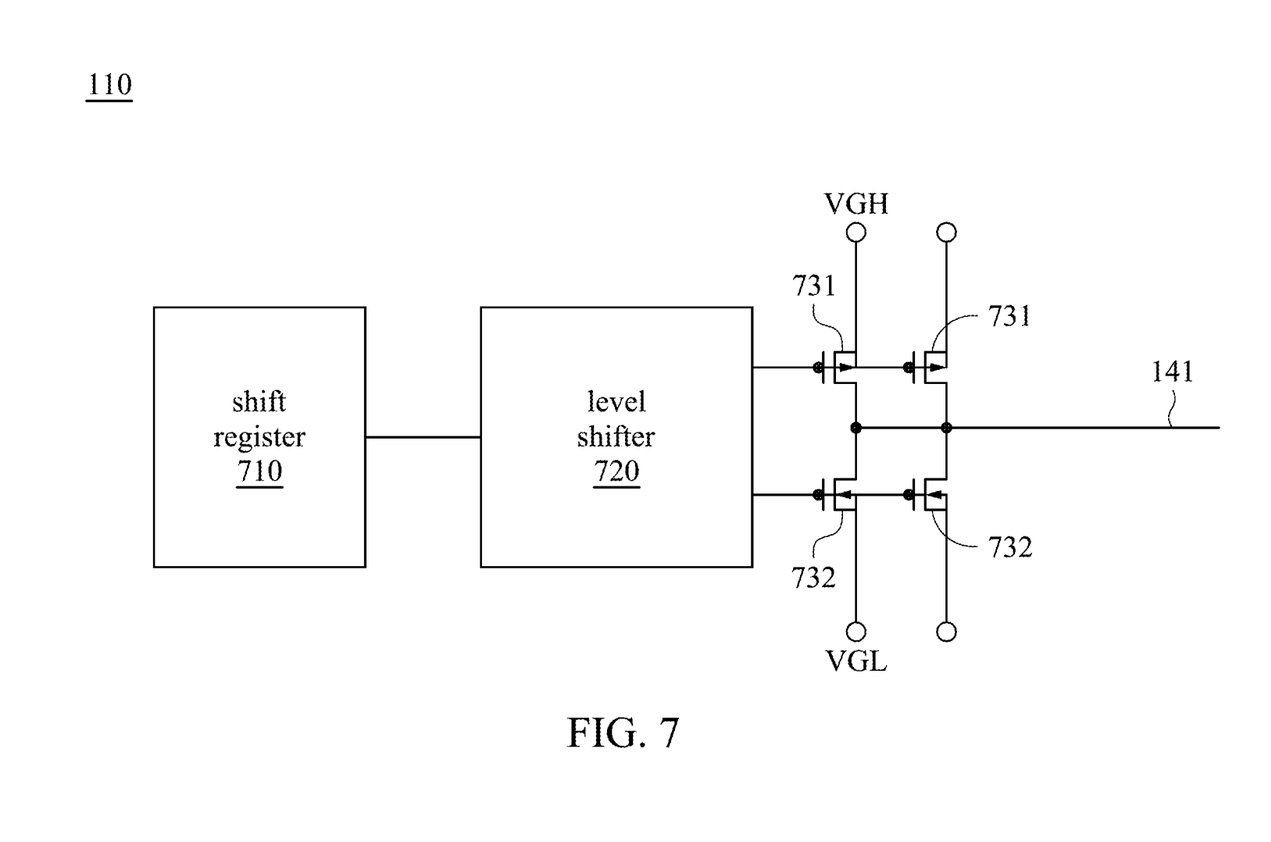
FIG. 7 is a circuit diagram of the gate driver circuit according to an embodiment.

Referring to FIG. 7 which is a circuit diagram of the gate driver circuit according to an embodiment. As the gate driver 110 has to drive three cholesteric liquid crystal panels, the resistance on the gate lines will increase, and therefore it is necessary to increase the driving force for the gate driving signals. In the embodiment of FIG. 7, the gate driver 110 includes a shift register 710, a level shifter 720, multiple P-type transistors 731, and multiple N-type transistors 732. The level shifter 720 is electrically connected to the shift register 710. Taking one gate line 141 as an example, the P-type transistor has a control end electrically connected to the level shifter 720, a first end electrically connected to a system voltage VGH, and a second end electrically connected to the gate line 141. The N-type transistor 732 has a control end electrically connected to the level shifter 720, a first end electrically connected to the gate line 141, and a second end electrically connected to a system voltage VGL. In this embodiment, the number of the P-type transistors 731 is greater than one while the number of the N-type transistors 732 is also greater than one to increase the current output to the gate line 141. In some embodiments, a single P-type transistor 731 and a single N-type transistor 732 may be used, but with wider channel widths. For example, the channel width of the P-type transistor 731 may be greater than or equal to 6 microns, such as 9 microns, and the channel width of the N-type transistor 732 may also be greater than or equal to 6 microns, such as 9 microns.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A cholesteric liquid crystal display (CLCD) device comprising:
a first cholesteric liquid crystal panel configured to reflect light within a first wavelength range, wherein the first cholesteric liquid crystal panel comprises a plurality of first gate lines extending from a first side of the first cholesteric liquid crystal panel to a second side of the first cholesteric liquid crystal panel;

a second cholesteric liquid crystal panel configured to reflect light within a second wavelength range, wherein the second cholesteric liquid crystal panel comprises a plurality of second gate lines extending from a first side of the second cholesteric liquid crystal panel to a second side of the second cholesteric liquid crystal panel;

a gate driver disposed at the first side of the first cholesteric liquid crystal panel and electrically connected to the first gate lines;

a first flexible printed circuit having a first end and a second end, wherein the first end of the first flexible printed circuit is disposed at the second side of the first cholesteric liquid crystal panel and electrically connected to the first gate lines, and the second end of the first flexible printed circuit is disposed at the second side of the second cholesteric liquid crystal panel and electrically connected to the second gate lines, such that the first gate lines are electrically connected to the second gate line respectively;

a third cholesteric liquid crystal panel configured to reflect light within a third wavelength range, wherein the third cholesteric liquid crystal panel comprises a plurality of third gate lines extending from a first side of the third cholesteric liquid crystal panel to a second side of the third cholesteric liquid crystal panel; and a second flexible printed circuit having a first end and a second end, wherein the first end of the second flexible printed circuit is disposed at the first side of the second cholesteric liquid crystal panel and electrically connected to the second gate lines, and the second end of the second flexible printed circuit is disposed at the first side of the third cholesteric liquid crystal panel and electrically connected to the third gate lines, such that the second gate lines are electrically connected to the third gate lines respectively.

2. The CLCD device of claim 1, wherein the first flexible printed circuit has a first surface and a second surface opposite to each other, and comprises:
a plurality of first pads disposed on the first surface of the first flexible printed circuit and positioned at the first end of the first flexible printed circuit; and
a plurality of second pads electrically connected to the first pads respectively, and disposed on the second surface of the first flexible printed circuit and positioned at the second end of the first flexible printed circuit.

3. The CLCD device of claim 2, wherein the first cholesteric liquid crystal panel and the second cholesteric liquid crystal panel are stacked up such that the first side of the first cholesteric liquid crystal panel is aligned with the first side of the second cholesteric liquid crystal panel, and the second side of the first cholesteric liquid crystal panel is aligned with the second side of the second cholesteric liquid crystal panel.

4. The CLCD device of claim 3, wherein the first flexible printed circuit is bent such that the first pads are in contact with the first cholesteric liquid crystal panel and the second pads are in contact with the second cholesteric liquid crystal panel.

5. The CLCD device of claim 4, wherein the second flexible printed circuit has a third surface and a fourth surface opposite to each other, and comprises:
a plurality of third pads disposed on the third surface and positioned at the first end of the second flexible printed circuit; and
a plurality of fourth pads electrically connected to the third pads respectively, disposed on the fourth surface and positioned at the second end of the second flexible printed circuit.

6. The CLCD device of claim 5, wherein the second cholesteric liquid crystal panel and the third cholesteric liquid crystal panel are stacked up such that the first side of the second cholesteric liquid crystal panel is aligned with the first side of the third cholesteric liquid crystal panel, and the second side of the second cholesteric liquid crystal panel is aligned with the second side of the third cholesteric liquid crystal panel.

7. The CLCD device of claim 6, wherein the second flexible printed circuit is bent such that the third pads are in contact with the second cholesteric liquid crystal panel and the fourth pads are in contact with the third cholesteric liquid crystal panel.

8. The CLCD device of claim 1, wherein during a display period, the gate driver is configured to transmit a plurality of gate driving signals to the first gate lines, wherein the gate driving signals are transmitted to the second gate lines through the first flexible printed circuit and then to the third gate lines through the second flexible printed circuit.

9. The CLCD device of claim 1, wherein the first cholesteric liquid crystal panel, the second cholesteric liquid crystal panel, and the third cholesteric liquid crystal panel form a stack, and the CLCD device further comprises a light absorbing layer disposed at one side of the stack.

10. The CLCD device of claim 9, wherein cell gaps of the first cholesteric liquid crystal panel, the second cholesteric liquid crystal panel, and the third cholesteric liquid crystal panel are different from each other.

11. The CLCD device of claim 10, wherein the first wavelength range is a blue wavelength range, the second wavelength range is a green wavelength range, and the third wavelength range is a red wavelength range.

12. The CLCD device of claim 1, wherein the gate driver comprises:
a shift register;
a level shifter electrically connected to the shift register;
at least one P-type transistor having a control end electrically connected to the level shifter, a first end electrically connected to a first system voltage, and a second end electrically connected to one of the first gate lines; and
at least one N-type transistor having a control end electrically connected to the level shifter, a first end electrically connected to the one of the first gate lines, and a second end electrically connected to a second system voltage.

13. The CLCD device of claim 12, wherein a number of the at least one P-type transistor is greater than one, and a number of the at least one N-type transistor is greater than one.

* * * * *